Patented Oct. 26, 1926.

1,604,575

UNITED STATES PATENT OFFICE.

MAJOR E. HOLMES AND GAIL J. FINK, OF WASHINGTON, DISTRICT OF COLUMBIA, ASSIGNORS TO NATIONAL LIME ASSOCIATION, OF WASHINGTON, DISTRICT OF COLUMBIA, A CORPORATION OF THE DISTRICT OF COLUMBIA.

PRODUCTION OF QUICK-SETTING LIME PRODUCTS BY THE ADDITION OF CARBONATES.

No Drawing. Application filed May 28, 1923. Serial No. 642,076.

Our invention relates to the production of plastic cementitious materials which have quick initial setting properties and which are adapted to be used in the making of mortars, plasters, shaped articles such as blocks and the like.

The use of calcined gypsum for plastering purposes is well known. Gypsum sets so quickly that it is necessary to add varying proportions of a retarding agent to delay the set sufficiently to allow the workmen time to get the plaster on the wall. In addition to this objection, gypsum has a number of other serious objections and disadvantages. For example, the material is difficult to work, owing to its lack of plasticity and, as compared to lime, its low sand-carrying capacity. Large quantities of lime are used for plastering purposes but in using this material it is necessary to wait a considerable period of time—twenty to twenty-four hours—for each coat to acquire what may be termed its initial set, by which it becomes sufficiently strong, firm and dry so that the succeeding coat may be applied. This is quite a serious objection since it requires the removal of scaffolds from one room to another between the application of the various coats, if the workmen are not to suspend work entirely.

We have found that quick initial setting properties may be imparted to plastic materials such as lime and thereby the latter may be successfully used for plastering purposes and for the production of mortars, blocks and the like.

We have found that by mixing with hydrated lime or lime putty varying percentages of metallic carbonates, the lime acquires quick initial setting properties.

The term "initial set" is used to indicate that condition of the lime plaster which makes it suitable for the application of the second or brown coat. It is not necessarily hard in this condition, but is firm, strong and rigid enough to support the weight of the second coat and withstand the pressure necessary in the application of the second coat. This is distinguished from the term "hardening" in that the latter refers to the condition of the mortar after it has undergone practically all the physical and chemical changes that it will undergo and has developed a strength near its maximum strength.

Ordinarily, lime mortar does not harden to the final condition of hardness for a great many months and in some cases a number of years, whereas the initial set occurs in about 20 hours when using standard sanded lime mortar, and in our mortar, the initial set is so quickened as to occur in some cases in less than one-half hour. The term, "quick set" is used to distinguish between slow setting lime mortar which requires about 20 hours to acquire its initial setting and our material which sets in some cases in less than one-half hour. We do not desire to set any definite limit as to the time it takes our material to acquire its initial set as this will depend on the character of the lime and the type and percentage of metallic carbonate used. The term "set" is sometimes used indiscriminately as synonymous with hardness. When so used, it is, of course, clear that the final hardness of the material is referred to.

We have used the standard Gillmore needle in testing for the set of lime mortar. We find that when the heavily weighted Gillmore needle penetrates to a distance of 2 mm. in the pat the mortar has assumed its set, that is, it is in a condition to receive the second coat. This relation between the penetration of the needle and its suitability for the second coat, has been checked up by practical plasterers.

It appears that while the carbonates, in general, have accelerating properties, those which more readily hydrolyze, have the most positive effect. For example, calcium, barium and strontium carbonates which do not hydrolyze to an appreciable extent, are only slightly effective in reducing the time of set of plastic lime mixes such as lime mortars. However, magnesium, which appears in Group II of Mendeleeff's periodic system of classification of the elements, and which readily hydrolyzes is very effective in producing an accelerated set. Zinc, manganese and the ferrous carbonates are very active and materially reduce the time of set. In general, we note, referring to Mendeleeff's classification, that the most positive effect is produced by the metal carbonates, the metal thereof embracing an element classified in Subgroup 2 of Group I, those in Group II forming easily-hydrolyzable carbonates and the remaining groups of the periodic table.

As a specific example, illustrative of our invention the following is given: A suitable plaster may be prepared by mixing 5% of magnesium carbonate with a 1:3 lime mortar mix, that is, 1 part of hydrated lime and 3 parts of sand, and adding the requisite amount of water. The percentage of addition agent added is calculated on the combined weight of the lime and addition agent. For example, 5% of magnesium carbonate means 5 parts of magnesium carbonate and 95 parts of lime. Such a plaster will set sufficiently in 6 hours and 30 minutes to permit the application of a second coat. If the percentage of magnesium carbonate be increased to 10%, the plaster will set in 50 minutes. A similar plaster to which the carbonate has not been added will require 22½ hours to set and dry to the same degree. The addition of 10% of zinc carbonate to a plaster will reduce the time of set to 20 minutes. It is quite evident that the time of set may be increased or decreased by regulating the quantity of the addition agent. It may be desirable for certain purposes to retard the time of set and this may be accomplished by the addition of suitable retarders such as glue, casein, sugar, dried blood, ground tankage and the like.

The following table gives the effect of the addition of a number of carbonates on the period of set of a 1:3 lime mortar, the percentage of addition agent specified being calculated on the combined weight of lime and addition agent:

| Substance added | Per cent addition agent | Time of set | |
|---|---|---|---|
| | | Hrs. | Mins. |
| Hydrated lime alone | | 22 | 30 |
| Magnesium carbonate | 5 | 6 | 30 |
| Magnesium carbonate | 10 | 0 | 50 |
| Magnesium carbonate | 10 and 0.4 sugar | 6 | 00 |
| Strontium carbonate | 10 | 19 | 00 |
| Barium carbonate | 10 | 16 | 00 |
| Zinc carbonate | 10 | 0 | 20 |
| Lead carbonate | 10 | 13 | 00 |
| Manganese carbonate | 10 | 4 | 30 |
| Cobalt carbonate | 10 | 7 | 35 |
| Nickel carbonate | 10 | 7 | 00 |
| Ferrous carbonate | 5 | 9 | 00 |
| Ferrous carbonate | 10 | 7 | 30 |
| Copper carbonate | 10 | 13 | 00 |
| Cadmium carbonate | 10 | 15 | 00 |
| Prepared gypsum plaster | | 9 | 30 |

Our experiments indicate that the soluble carbonates such as sodium and potassium carbonates and bicarbonates, also produce a quick initial set, but these compounds yield a plastic which effloresces. For this reason, they are not very desirable addition agents. However, if certain deefflorescing agents such as lead acetate, lead or zinc oxide, antimony oxide and the like be added to the plastic to render the salts formed less soluble, the soluble carbonates mentioned may be used.

The materials forming the plaster mix are mixed in a dry state and there is no reaction between mix-constituents until after water is added. Proceeding in this manner the accelerating agent, lime and other ingredients may be mixed at the place of manufacture and thereby a prepared dry plaster mix sent to the trade which requires only the addition of water to be immediately available for use. We do not, however, desire to be limited to this particular method of preparation. Comparable results are obtained by adding the carbonate to a putty made from hydrated lime or by the slaking of quicklime.

It has been proposed to add addition agents to lime to produce certain results, but as far as we are aware, our addition agents have not been added in the way and for the purpose we add them. Thus, it has been proposed to slake quicklime with a solution of carbonates. In all such cases, the reaction described above, which it is desired to have take place after the mortar or plaster is put into place has already taken place almost completely before the mortar or plaster is prepared and its effect, in so far as the setting up of the finished plaster is concerned, is entirely lost. The result is the same as that which would be obtained by tempering a gypsum plaster which has already taken its set. The material would already have been hydrated and would not have any further setting properties.

It is obvious that, together with the carbonate, other addition agents may be added to confer desirable properties upon the finished product. For example, for certain kinds of masonry work, it may be very desirable to make a strong mortar, and in that case Portland cement may be added to the lime and carbonate mix. Again, it may be desirable to make very dense products which may be accomplished by taking advantage of the shrinkage resulting from the addition of lead compounds.

The term, "hydrated lime" as used in the specification and claims includes the various kinds of commercial hydrated lime which may vary considerably in its composition. It is intended to include thereunder both calcium and dolomitic hydrated lime. In addition, we intend to cover by this term dry hydrated lime which is a definite article of commerce or lime putty which may be made from lime hydrate or from quick lime.

It is obvious that hair, asbestos or similar materials may be added to the lime-carbonate mix.

We claim:

1. A cementitious material having quick initial setting properties comprising hydrated lime and a metal carbonate which readily hydrolyzes.

2. A cementitious material having quick initial setting properties comprising hydrated lime and a metal carbonate which readily hydrolyzes and does not produce an appreciable amount of efflorescence.

3. A cementitious material having quick initial setting properties comprising hydrated lime and a metal carbonate, the metal thereof embracing an element classified in Subgroup 2 of Group I, those in Group II forming easily hydrolyzable carbonates and the remaining groups of the periodic table.

4. A cementitious material having quick initial setting properties comprising hydrated lime and magnesium carbonate.

5. A cementitious material having quick initial setting properties comprising hydrated lime, a retarder and a metal carbonate which readily hydrolyzes.

6. A cementitious material having quick initial setting properties comprising hydrated lime, a retarder and a metal carbonate which readily hydrolyzes and does not produce an appreciable amount of efflorescence.

7. A prepared plaster mix having quick initial setting properties comprising hydrated lime and a metal carbonate which readily hydrolyzes.

8. A prepared plaster mix having quick initial setting properties comprising hydrated lime and a metal carbonate which readily hydrolyzes and does not produce an appreciable amount of efflorescence.

9. A prepared plaster mix having quick initial setting properties comprising hydrated lime and a metal carbonate, the metal thereof embracing an element classified in Subgroup 2 of Group I, those in Group II forming easily hydrolyzable carbonates and the remaining groups of the periodic table.

10. A prepared plaster mix having quick initial setting properties comprising hydrated lime and magnesium carbonate.

11. A prepared dry plaster mix having quick initial setting properties comprising hydrated lime and a metal carbonate which readily hydrolyzes.

12. The process of producing a cementitious material adapted to set quickly comprising making hydrated lime and then mixing the hydrated lime in the presence of water with a carbonate of a metal, and allowing the resulting product to set.

13. The process of producing a cementitious material adapted to set quickly comprising mixing in the presence of water hydrated lime and a carbonate of a metal which readily hydrolyzes and allowing the resulting product to set.

14. The process of producing a cementitious material having quick initial setting properties comprising mixing in the presence of water hydrated lime and a metal carbonate, the metal thereof embracing an element classified in Subgroup 2 of Group I, those in Group II forming easily hydrolyzable carbonates and the remaining groups of the periodic table.

15. The process of producing a cementitious material having quick initial setting properties comprising mixing in the presence of water hydrated lime and magnesium carbonate.

In testimony whereof they hereunto affix their signatures.

MAJOR E. HOLMES.
GAIL J. FINK.